US010889245B2

(12) United States Patent
Timoneda et al.

(10) Patent No.: US 10,889,245 B2
(45) Date of Patent: Jan. 12, 2021

(54) VEHICLE IMAGING SYSTEM

(71) Applicant: FICOMIRRORS, S.A.U., Barcelona (ES)

(72) Inventors: David Gómez Timoneda, Barcelona (ES); Frédéric Lorival, Torfou (FR)

(73) Assignee: FICOMIRRORS, S.A.U., Barcelona (ES)

( * ) Notice: Subject to any disclaimer, the term of this patent is extended or adjusted under 35 U.S.C. 154(b) by 26 days.

(21) Appl. No.: 16/198,243

(22) Filed: Nov. 21, 2018

(65) Prior Publication Data

US 2019/0161011 A1 May 30, 2019

(30) Foreign Application Priority Data

Nov. 24, 2017 (EP) .................................... 17382794

(51) Int. Cl.
*B60R 1/00* (2006.01)
*G06K 9/00* (2006.01)

(52) U.S. Cl.
CPC ............ *B60R 1/00* (2013.01); *G06K 9/00791* (2013.01); *B60R 2300/70* (2013.01); *B60R 2300/802* (2013.01); *B60R 2300/8026* (2013.01); *B60R 2300/8066* (2013.01)

(58) Field of Classification Search
CPC . B60R 1/00; B60R 2300/70; B60R 2300/802; B60R 2300/8026; B60R 2300/8066; G06K 9/00791
USPC .......................................................... 348/148
See application file for complete search history.

(56) References Cited

U.S. PATENT DOCUMENTS 9,041,806 B2 * 5/2015 Baur ......................... B60R 1/00 348/148
9,697,735 B2 * 7/2017 Michiguchi ............ G08G 1/166
10,053,015 B2 * 8/2018 Peterson ................ B60R 1/002

* cited by examiner

*Primary Examiner* — William C Vaughn, Jr.
*Assistant Examiner* — Jae N Noh
(74) *Attorney, Agent, or Firm* — Cantor Colburn LLP

(57) ABSTRACT

A vehicle imaging system for a vehicle including a rear viewing device configured to be located at a lateral side of the vehicle. The vehicle imaging system including an image capturing unit and a display unit. The image capturing unit is configured to take images of surroundings of the vehicle, is located in the proximity of the rear viewing device, includes an optical axis and a field of view, and is configured such that the field of view of the image capturing unit generally extends rearward until a forward limit of a field of view of the rear viewing device. The display unit is configured to communicate with the image capturing unit and displays the images, and is adapted to be located in an interior of the vehicle.

12 Claims, 4 Drawing Sheets

12 8 20 20 10 1 7 11

VEHICLE IMAGING SYSTEM

CROSS-REFERENCE TO RELATED APPLICATION

This application claims the priority of European Application No. 17382794.0 filed on Nov. 24, 2017, which is incorporated herein by reference, in its entirety.

FIELD OF THE INVENTION

The present invention refers to a vehicle imaging system, more specifically, to a camera for commercial vehicles.

The system is of the kind that displays images of the exterior environment of the vehicle taken by at least one camera mounted in the proximity of a rear viewing device located in a lateral side of the vehicle.

BACKGROUND OF THE INVENTION

It is known that the commercial vehicles are used to transport commercial goods and for that reason usually do not provide rear and/or lateral windows. This fact has the disadvantage that said lack of rear and/or lateral windows, either on the passenger side or on the driver side, increases the blind spot with respect to a conventional passenger car. There is thus a need to propose a solution for minimizing the blind spot on the lateral side in a commercial vehicle.

There are also known vehicle imaging systems that comprise:

- an image capturing unit, for instance a camera, configured for taking images of the surroundings of the vehicle, having an optical axis and a field of view (FOV), and
- a display unit, for instance, a screen or a mirror usually located in the interior of the vehicle, connectable to the image capturing unit and configured to display the image taken by the capturing unit.

The aforementioned display units can be located anywhere in the vehicle, for instance, on the dashboard, in a rear viewing device or in any other type of screen that is able to represent an image, mainly a digital image, as long as it is viewable by the driver.

For the sake of clarity, the terms field of vision (FOV) and optical axis are herewith clarified. The field of view (FOV) is the captured area by the image capturing unit and the optical axis is an imaginary line along which there is some degree of rotational symmetry in an optical system such as a camera, said imaginary line defines the path along which light propagates through the optical system.

SUMMARY OF THE INVENTION

The imaging system object of the invention is capable of providing a view of blind spot areas adjacent the commercial vehicle thus enhancing the driver's view for checking blind areas by viewing a display unit that provides the rear-view image of said blind spots.

The image capturing unit of the vehicle imaging system is configured for being located in the proximity of a lateral rear viewing device, the image capturing unit configured for taking images of the surroundings of the lateral rear side of the vehicle, the image capturing unit being configured such that its field of view extends until the limit of the field of view of the rear viewing device.

Therefore, the imaging system object of the invention collaborates in providing an expanded view of the rear end of the commercial vehicle, decreasing the blind-spot prevalent with respect to conventional rear-view mirrors.

Additionally, it has to be observed that the camera is thus used as a complementary of the mirror, not for replacing the rear mirror. It has the advantage that no distortion is introduced into the captured image that could derive in misinterpretation of the speed of another vehicle due to deformation of the captured imaged related to a high field of view (FOV) of the image capturing unit.

DESCRIPTION OF THE DRAWINGS

To complete the description and in order to provide for a better understanding of the invention, a set of drawings is provided. Said drawings form an integral part of the description and illustrate preferred embodiments of the invention. The drawings comprise the following figures.

DETAILED DESCRIPTION OF THE INVENTION

Figure 1:
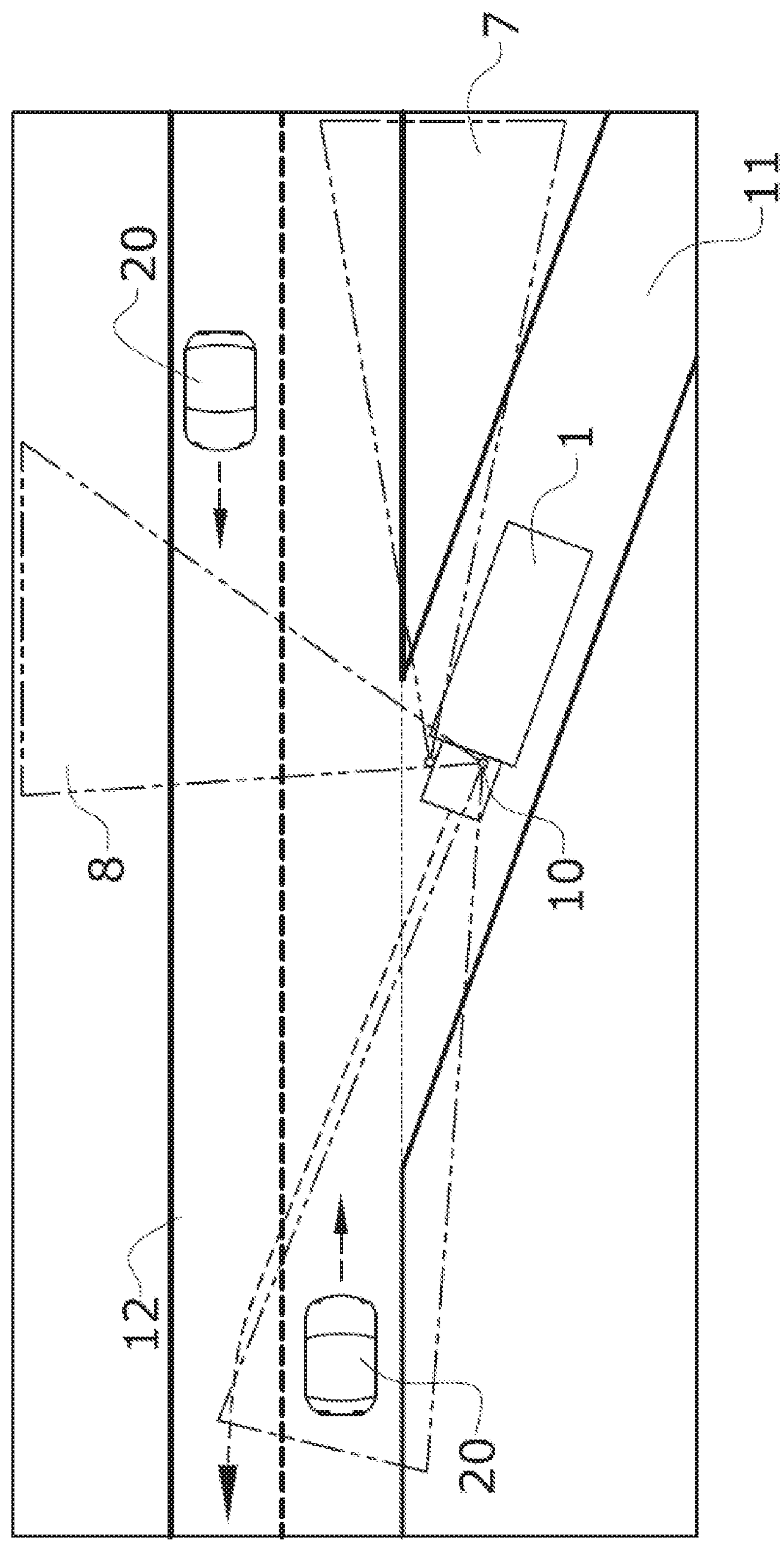
FIG. 1 shows an overhead view of a left-hand drive commercial vehicle located in an entrance lane to a main road in which two adjacent vehicles are travelling in opposite directions, one coming from the rear part of the commercial vehicle and the other coming from the front of the commercial vehicle, both approaching the entrance lane. The fields of view (FOV) of the driver and of the rear viewing device of the commercial vehicle are depicted.
Figure 2:
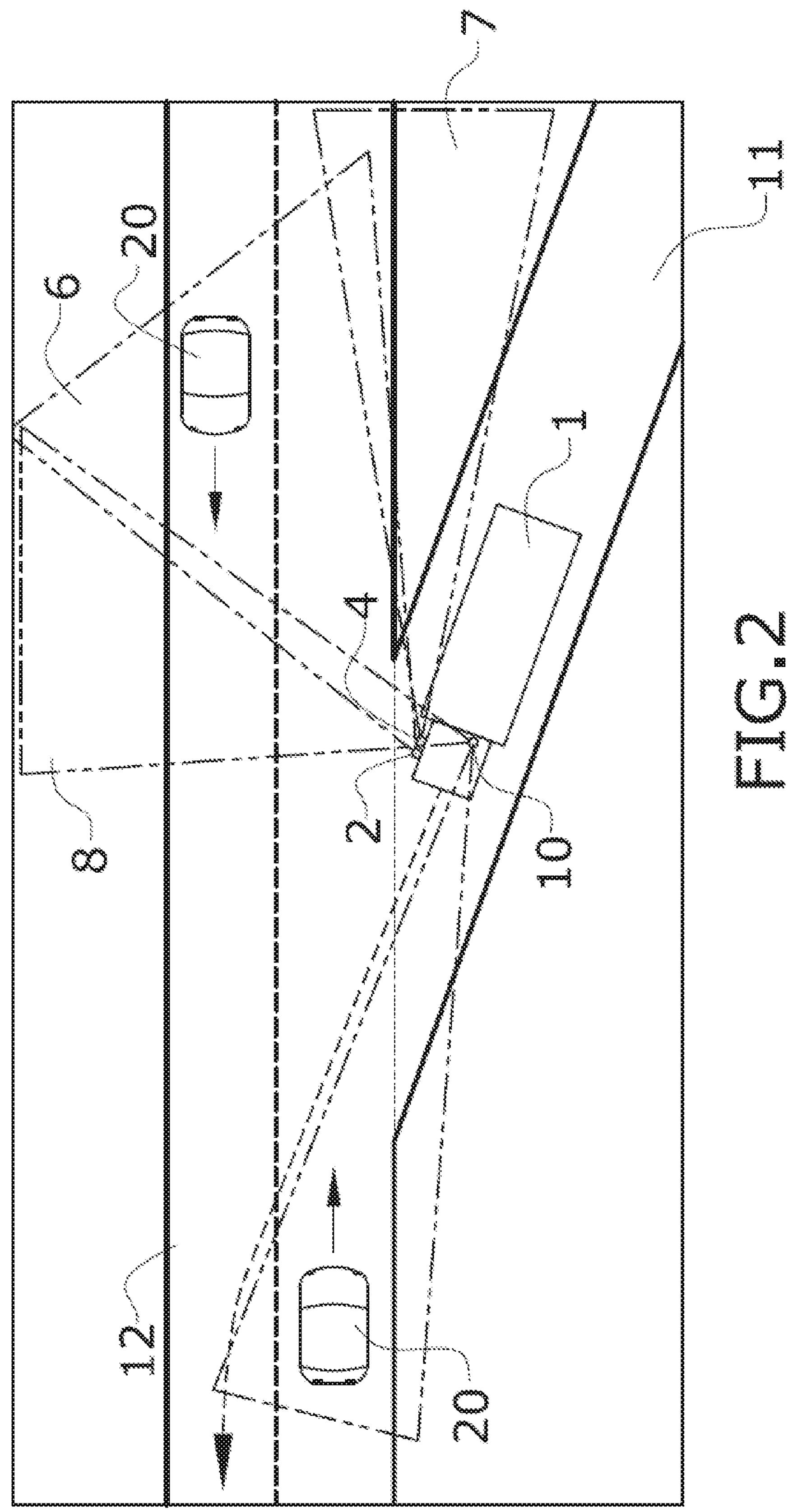
FIG. 2 shows the same plan view of FIG. 1 adding the field of view (FOV) of an embodiment of the vehicle imaging system.
Figure 3:
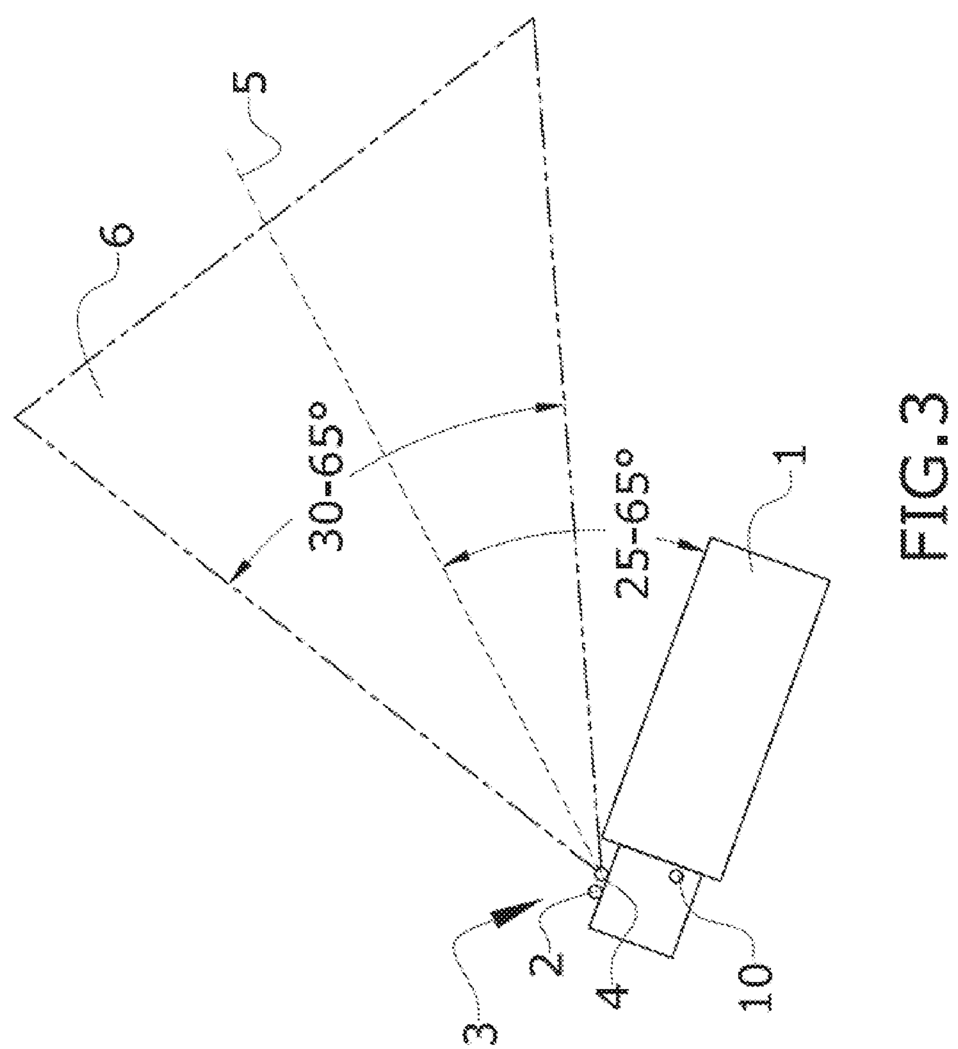
FIG. 3 shows a schematic plan view of a left-hand vehicle with a vehicle imaging system, its optical axis and its field of view (FOV).
Figure 4:
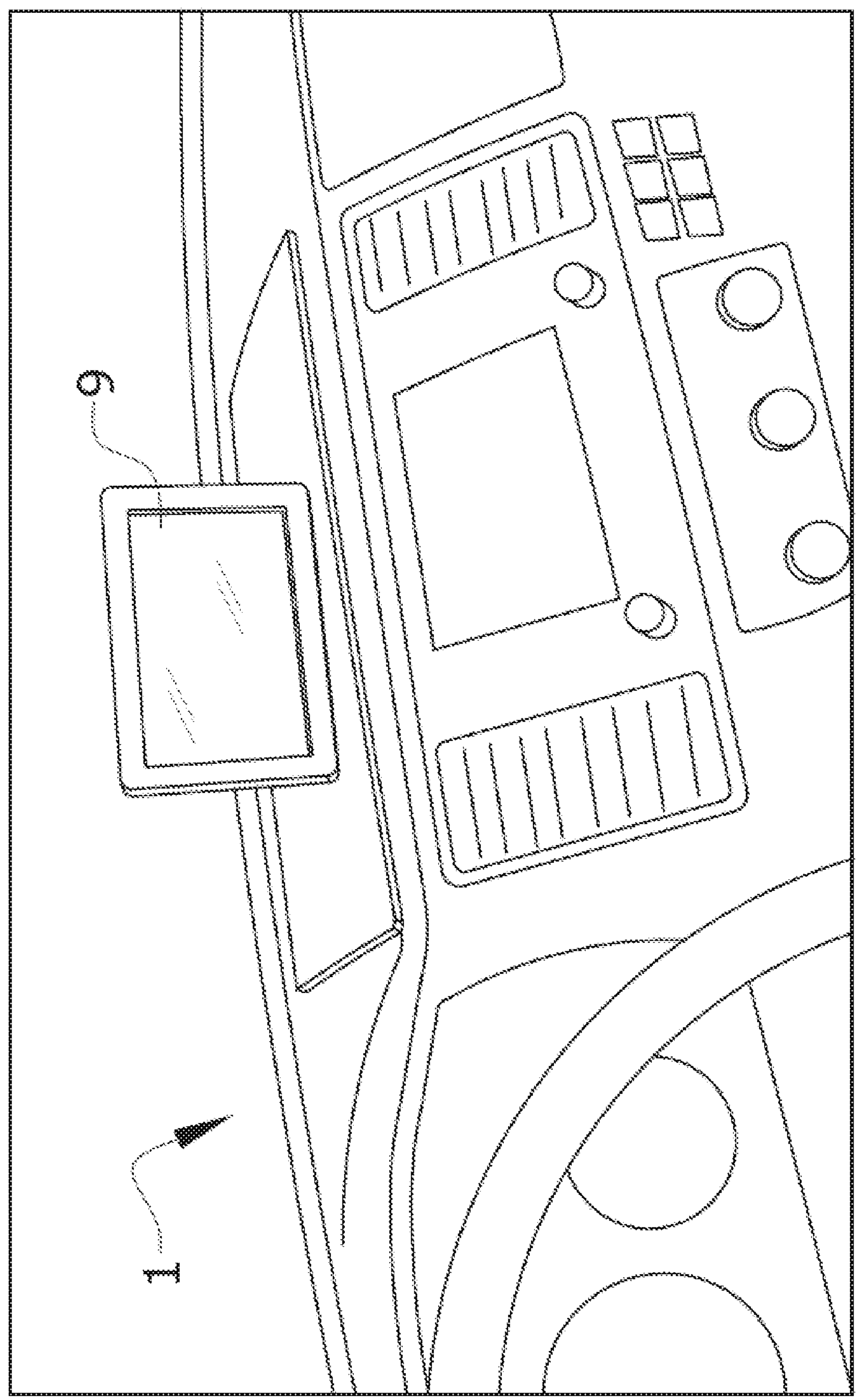
FIG. 4 shows an embodiment of a display unit located on a dashboard of a vehicle.

FIGS. 1 and 2 show the vehicle (1) located in an entrance lane (11) of a main road (12) in which two adjacent vehicles (20) are travelling in opposite directions, one coming from the rear part of the commercial vehicle (1) and the other coming from the front of the commercial vehicle (1), both approaching the entrance lane (11). The field of view (FOV) (8) of the driver (10) from the passenger's window and the field of view (FOV) (7) of the rear viewing device (2), that in this embodiment is a rear mirror of the commercial vehicle (1) located in the passenger side, are depicted in both figures. FIG. 2 discloses the field of view (FOV) (6) of the image capturing unit (4).

The rear viewing device (2) can be a rear mirror, as in the accompanying figures, or it can be a camera showing a rear view of the vehicle (1).

In the shown figures, the image capturing unit (4) of the vehicle imaging system object of the invention is configured for being located in the proximity of the passenger's rear mirror (2) location of the vehicle (1). For instance, it could be located directly on the support of the rear viewing device (2) or located on other element in the proximity of said support. The image capturing unit (4) is also configured for taking images of the surroundings of the lateral rear side of the vehicle (1) such that its field of view (6) extends until the limit of the field of view (7) of the rear mirror (2).

FIGS. 1 and 2 show an embodiment in which the image capturing unit (4), specifically a camera, is also configured such that its field of view (6) extends until the limit of the field of view (8) in which a driver (10) could see the images surrounding the lateral rear side of the vehicle (1) through the passenger window of the vehicle (1).

The optical axis (5) of the image capturing unit (4) is configured to be extended from 25° to 65° with respect to the vehicle (1) longitudinal axis. More preferably, is configured to be extended from 35° to 55° with respect to the vehicle (1) longitudinal axis as shown in the embodiment of the figures.

In turn, the field of view (6) of the image capturing unit (4) is configured to generally span between twenty degrees to seventy degrees (20° to 70°). More preferably, the field of view (6) is configured to be extended from about thirty degrees to sixty degrees (30° to 60) to avoid, or minimize, distortion of the image which may otherwise produce a false perception of the speed of the vehicle (20) heading towards the driver's vehicle (1).

Therefore, as the embodiment depicted in FIGS. 1 and 2:

The field of view (FOV) (6) of the camera starts when the field of view (FOV) (7) of the rear mirror (2) ends in the forward side.

The field of view (FOV) (6) of the camera finishes when the driver (10) could already see through the passenger window.

The vehicle imaging system may additionally comprise a control unit configured to receive at least one parameter related to the movement of the vehicle (1) and also configured to send a signal to the display unit (9) to turn it on/off according to the received parameter. Thus, the vehicle imaging system could have communication with the vehicle (1) to get vehicle data. Said parameter could be the activation of the passenger's turn signal by the driver (10). Additionally it can be combined with a parameter related to the speed of the vehicle (1).

In an embodiment, when the driver (10) activates the left turn signal, in a left-hand drive vehicle (1) or the right one in a right-hand drive vehicle (1), and the commercial vehicle (1) goes at less than, for example, 40 km/h, the camera turns ON and, for instance, the display (9) shows the captured image automatically. When the turn signal turns off (or few seconds later), the camera turns off and the display (9) returns to the initial image.

Another option would be that the parameter is the activation of a switch configured for being activated by the driver (10). Thus the driver (10) could activate the camera image manually through the display (9) interface or using a button in an accessible place.

The image could be shown in the display (9) in full screen or like picture in picture (PinP) according the desired configuration.

The thresholds of speed activation, the period of time that the image remains on the display (9) and the size of camera image (full screen or PinP) will be also predefined and could be adjustable or not by the driver (10).

As a complement to the above, a control unit could also be configured for processing the captured image of the exterior environment of the vehicle (1) such that it is able to detect an object in movement in the captured image that could be potentially dangerous. Said control unit could be the same control unit as previously explained or another control unit, as an imaging processor unit. Additionally, the control unit could be configured to send a signal to the display unit (9) to turn it on if an object in movement is detected in the captured image and therefore the captured image is shown automatically.

The display unit (9) could also be configured to show a warning image. Said warning image can be a flashing square in the border of the image or a text in picture.

Additionally, if the driver (10) activates the left turn signal (in a left-hand drive vehicle, the right one in a right-hand drive vehicle) and goes under a predefined speed threshold, the camera image taken by the image capturing unit (4) will show up in the display unit (9) but without a warning signal.

The display unit (9) could be configured to display the captured image as if reflected in the display unit (9), i.e. processing the taken image so as to be shown as if the display unit (9) were a rear view mirror and hence the displayed image would be a specular image of the captured image. Alternatively, the display unit (9) could be configured to display the captured image as directly taken by the image capturing unit (4), without the previously indicated processing of the image to make it specular. From a practical way in an embodiment in which the image capturing unit (4) would be located in the passenger side, in the first alternative, i.e. the specular alternative, the image would have the part of the vehicle (1) in the left part and the road at the right part, and in the second alternative, the part of the vehicle would be in the right part of the image and the road in the left part.

Additionally, it has to be taken into account that the vehicle (1) may have a camera unit as rear viewing device (2). In that case, the vehicle (1) may have two different displays, one for showing the image captured by the image capturing unit (4) according to the invention and another one for showing the image captured by the rear viewing device (2). As an alternative, the vehicle (1) may have one single display unit (9) for showing both captured images being the display unit (9) configured to display the captured image, as if reflected or as taken, and a captured image from the rear viewing device (2) when said rear viewing device (2) is a camera unit.

In a first embodiment, i.e., the vehicle (1) comprises one single display unit (9) for displaying both captured images together, the display unit (9) may be configured to display the image captured by the capturing unit (4) as a specular image and adjacent to it, the image taken by the rear viewing device (2), also as a specular image. Therefore, the display unit (9) would show, from left to right in an embodiment in which both the rear viewing device (2) and the capturing unit (4) would be located at the passenger side, the field of view (7) of the rear viewing device (2) that also may include a part of the vehicle (1), and adjacent to it, the field of view (6) of the capturing unit (4). Both displayed images may be separated by a vertical bar. As an alternative, both images could be displayed as a joined image by stitching the two images.

In a second embodiment, i.e., the vehicle (1) comprising one single display unit (9) for displaying both images together, the display unit (9) may be configured to display the image captured by the capturing unit (4) as directly taken by said capturing unit (4), without any processing to make it specular, and adjacent to it, the image taken by the rear viewing device (2). The display (9) would be configured to display both images separated by a vertical bar so as not to confuse the driver (10).

The invention claimed is:

1. A vehicle imaging system for a vehicle including a rear viewing device configured to be located at a lateral side of the vehicle, the vehicle imaging system comprising:

an image capturing unit configured to take images of surroundings of the vehicle, located in the proximity of the rear viewing device, including an optical axis and a field of view, and configured such that the field of view of the image capturing unit generally extends rearward until a forward limit of a field of view of the rear viewing device;

a display unit configured to communicate with the image capturing unit and display the images, and adapted to be located in an interior of the vehicle, wherein the image capturing unit is configured such that the field of view of the image capturing unit generally extends forward until a rearward limit of a field of view of a driver viewed by the driver through a lateral window of the vehicle located in the lateral side; and a control unit configured to receive at least one parameter related to movement of the vehicle, and send a signal indicative of the at least one parameter to the display unit to facilitate turning the display unit on or off according to the at least one parameter, wherein the at least one parameter includes a speed of the vehicle.

2. The vehicle imaging system set forth in claim 1, wherein the optical axis of the image capturing unit spans between about twenty-five degrees to sixty-five degrees with respect to a longitudinal axis of the vehicle.

3. The vehicle imaging system set forth in claim 2, wherein the optical axis of the image capturing unit spans from about thirty-five degrees to about fifty-five degrees with respect to the longitudinal axis.

4. The vehicle imaging system set forth in claim 1, wherein the field of view of the image capturing unit spans between twenty degrees to seventy degrees with respect to a longitudinal axis of the vehicle.

5. The vehicle imaging system set forth in claim 4, wherein the field of view of the image capturing unit spans from about thirty degrees to about sixty degrees with respect to the longitudinal axis.

6. The vehicle imaging system set forth in claim 1, wherein the at least one parameter includes activation of a turn signal by the driver.

7. The vehicle imaging system set forth in claim 1, wherein the at least one parameter includes activation of a switch of the display unit and by the driver for displaying the images.

8. A vehicle imaging system for a vehicle including a rear viewing device configured to be located at a lateral side of the vehicle, the vehicle imaging system comprising:

an image capturing unit configured to take images of surroundings of the vehicle, located in the proximity of the rear viewing device, including an optical axis and a field of view, and configured such that the field of view of the image capturing unit generally extends rearward until a forward limit of a field of view of the rear viewing device;

a display unit configured to communicate with the image capturing unit and display the images, and adapted to be located in an interior of the vehicle, wherein the image capturing unit is configured such that the field of view of the image capturing unit generally extends forward until a rearward limit of a field of view of a driver viewed by the driver through a lateral window of the vehicle located in the lateral side; and a control unit configured to receive at least one parameter related to movement of the vehicle, and send a signal indicative of the at least one parameter to the display unit to facilitate turning the display unit on or off according to the at least one parameter, wherein the control unit is configured to process the images to detect a moving object.

9. The vehicle imaging system set forth in claim 8, wherein the control unit is configured to send a signal to the display unit to turn the display unit on if the moving object is detected.

10. The vehicle imaging system set forth in claim 1, wherein the display unit is configured to display a warning image.

11. The vehicle imaging system set forth in claim 1, wherein the display unit is configured to display at least one of a specular image of the images and the images as captured by the image capturing unit.

12. A vehicle imaging system for a vehicle, the vehicle imaging system comprising:

a rear viewing device configured to be located at a lateral side of the vehicle;

an image capturing unit configured to take images of surroundings of the vehicle, located in the proximity of the rear viewing device, including an optical axis and a field of view, and configured such that the field of view of the image capturing unit generally extends rearward until a forward limit of a field of view of the rear viewing device; and a display unit configured to communicate with the image capturing unit and display the images, and adapted to be located in an interior of the vehicle, wherein the image capturing unit is configured such that the field of view of the image capturing unit generally extends forward until a rearward limit of a field of view of a driver viewed by the driver through a lateral window of the vehicle located in the lateral side, wherein the display unit is configured to display at least one of a specular image of the images and the images as captured by the image capturing unit, wherein the display unit is configured to display a captured image from the rear viewing device, and the rear viewing device is a camera unit.

* * * * *